United States Patent [19]
Levy et al.

[11] Patent Number: 5,778,373
[45] Date of Patent: Jul. 7, 1998

[54] INTEGRATION OF AN INFORMATION SERVER DATABASE SCHEMA BY GENERATING A TRANSLATION MAP FROM EXEMPLARY FILES

[75] Inventors: Alon Yitzchak Levy. Berkeley Heights; Joann Janet Ordille. Maplewood, both of N.J.

[73] Assignee: AT&T Corp. Middletown, N.J.

[21] Appl. No.: 680,090

[22] Filed: Jul. 15, 1996

[51] Int. Cl.[6] .................... G06F 17/30; G06F 7/00
[52] U.S. Cl. .................... 707/100; 707/101; 707/102
[58] Field of Search .................... 395/611, 612, 395/613; 707/100, 102, 101

[56] References Cited

U.S. PATENT DOCUMENTS

| | | | |
|---|---|---|---|
| 5,133,068 | 7/1992 | Crus et al. | 395/600 |
| 5,341,498 | 8/1994 | Connor et al. | 395/600 |
| 5,430,873 | 7/1995 | Abe et al. | 395/650 |
| 5,442,786 | 8/1995 | Bowen | 395/600 |
| 5,548,749 | 8/1996 | Kroenke et al. | 395/600 |
| 5,611,035 | 3/1997 | Hall | 395/140 |

*Primary Examiner*—Krisna Lim

[57] ABSTRACT

A method of reducing the burden on database administrators when integrating information from a database system with a computer system over a computer network is disclosed. Rather than requiring the database administrator to express the meaning of database attribute names in a new language, the database administrators needs only to specify mappings between different database schemas by creating database example files. The database example files contain a common body of information values stored using the corresponding attribute names of the different database schemas. The database example files then become the basis for generation of a translation map between the computer system and the remote database system. Then, information queries from a user are translated with the translation map to the database schema of the remote database system.

12 Claims, 11 Drawing Sheets

FIG. 6

PS1. LOAD DATABASE EXAMPLE FILES 1 AND 2 INTO MEMORY

PS2. DETERMINE ALL POSSIBLE MAPPINGS

PS2A. FIND ALL 1-1 MAPPINGS

PS2B. FIND ALL 1-MANY MAPPINGS

PS2C. FIND ALL MANY-1 MAPPINGS

PS2D. FLAG ALL MAPPINGS WITH MISSING VALUES

PS2E. FIND ALL ATTRIBUTES WITH NO MAPPINGS

PS3. EXECUTE SINGLE MAPPING SCORING

PS3A. IF 1-1 MAPPING, +10 POINTS

PS3B. IF 1-1 MAPPING CASE SENSITIVE, +20 POINTS

PS3C. IF 1-1 MAPPING AGREED WITH COMMON WORDS, +50 POINTS

PS3D. IF MANY-1, 1-MANY, +5 POINTS FOR EVERY FIELD, +10 POINTS IF CASE SENSITIVE

PS3E. IF NO MISSING VALUES IN 1-MANY OR MANY-1, +20 POINTS

PS4. EXECUTE COMPARATIVE MAPPING SCORING

PS4A. IF MANY-1 OR 1-MANY MAPPING INCLUDES AN ATTRIBUTE WITH A 1-1 MAPPING SCORE > 20 POINTS, -25 POINTS

PS4B. IF MANY-1 OR 1-MANY MAPPING INCLUDES AN ATTRIBUTE WITH ANOTHER MANY-1 OR 1-MANY MAPPING WITH > 20 POINTS, -25 POINTS

PS4C. IF 1-1 A MAPPING INCLUDES AN ATTRIBUTE WITH ANOTHER 1-1 MAPPING HAVING > 40 POINTS, -25 POINTS.

PS5. GENERATE LOGICAL TRANSLATION STATEMENTS BASED ON MAPPINGS WITH BEST SCORE.

FIG. 7

COMMON NAMES FOR ATTRIBUTES:

first-name: first-name, firstname, firstin, first_name, first, givennames, given_name
last name: last-name, last_name, lastname, surname, surnom, Surname
title: title
email: email, e-mail, Email_Address, possible_e-mail, userid, addr.electr, e_post, Unix-email
office-phone: office-phone, phone, office_phone, campus_phone, work_phone, OfficePhone
home-phone: home-phone, phone
homepage: home-page, homepage, www
home-zip: zip, postal-code
office_zip: zip, postal-code
home-city: city, ville
office-city: city, ville
organization: organization, organism
division: division
department: department

FIG. 10

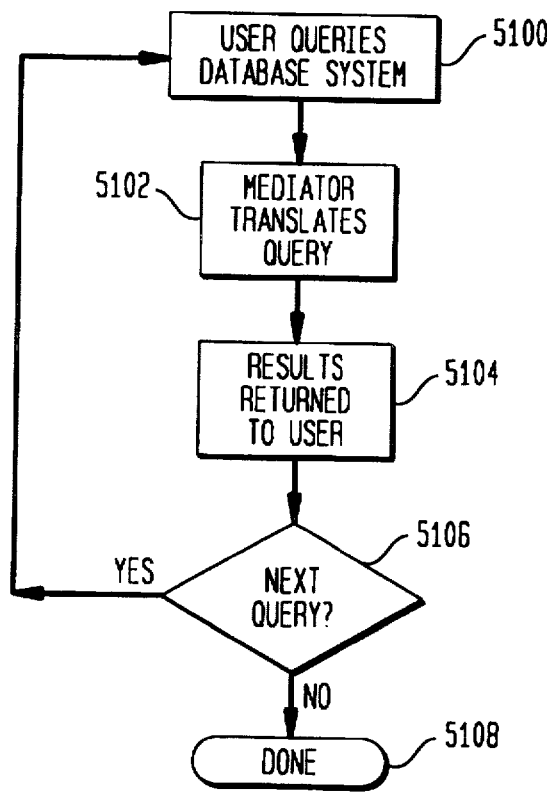

FIG. 8

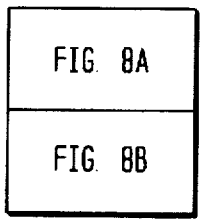

FIG. 8A

DANA FARBER CANCER INSTITUTE.
ENTRY AT INFORMATION SOURCE:

```
-200:2         name: mohamed s. ellozy
-200:2        phone: (617) 632-3034
-200:2          fax: (617) 632-2444
-200:2       office: DFCI M432
-200:2   department: BIO
-200:2        email: Mohamed_Ellozy@dfci.harvard.edu
-200:2         type: person
```

MAPPING TO WORLD VIEW PROVIDED BY ADMINISTRATOR:
name_first: Mohamed
name_middle: S
name_last: Ellozy
name_suffix:
email: Mohamed_Ellozy@dfci.harvard.edu
mhsmail:
www_homepage:
organization: Dana-Farber Cancer Institute
division:
department: BIO
title:
building:
street: 44 Binney Street
city: Boston
state_or_province: MA
postal_code: 02115
country: USA
phone: (617) 632-3034
home_apartment:
home_street:
home_city:
home_state_or_province:
home_postal_code:
home_country:
home_phone:
last_modified:

MAPPING PROGRAM GENERATED BY OUR PROGRAM. WORLD VIEW ATTRIBUTES ARE ON THE LEFT IN CAPITAL LETTERS. INFORMATION SOURCE ATTRIBUTES ARE ON RIGHT IN LOWER CASE. WHEN THERE ARE ALTERNATIVES, THE SCORE FOR THE ALTERNATIVE FOLLOWS IT IN A COMMENT (PRECEDED BY A ';'). ';' SIGNS PRECEDE ALL COMMENTS.

FIG. 8B

```
# WORLD VIEW ATTRIBUTE IS CONSTANT.
COUNTRY = "USA";
POSTAL_CODE = "02115";
STATE_OR_PROVINCE = "MA";
CITY = "Boston";

# WORLD VIEW ATTRIBUTE IS IDENTICAL TO SOURCE ATRIBUTE.
DEPARTMENT = department ;      # Score: 80
EMAIL = email ;                # Score: 80
PHONE = phone ;                # Score: 30

# WORLD VIEW ATTRIBUTE IS A PART OF THE SOURCE ATTRIBUTE.
# PART(NAME,1,1,DELIMITER) TAKES THE 1ST THROUGH THE 1ST WORDS OF NAME
#   WHERE WORDS ARE IDENTIFIED BY THE CHARACTERS IN THE STRING DELIMITER.
# RPART(NAME,1,1,DELIMITER) IS LIKE PART, BUT IT COUNTS WORDS FROM
#   THE END OF THE STRING. SO, THIS ACTUALLY TAKES THE LAST WORD IN
#   THE STRING.

NAME_FIRST = part(  w,1,1,Delimiter);    # SCORE: 10
NAME_LAST = rpart(  w,1,1,Delimiter);    # SCORE: 10

# The following alternatives were not used:

# NAME_FIRST = part(email,1,1,Delimiter);   # Score: -20
# NAME_LAST = substring(email);             # Score: -20

WORLD VIEW ATTRIBUTES THAT WERE NOT FOUND IN THE SOURCE.

HOME_PHONE = **;
HOME_COUNTRY = **;
HOME_POSTAL_CODE = **;
HOME_STATE_OR_PROVINCE = **;
HOME_CITY = **;
HOME_STREET = **;
HOME_APARTMENT = **;
STREET = **;
BUILDING = **;
TITLE = **;
DIVISION = **;
ORGANIZATION = **;
WWW_HOMEPAGE = **;
MHSMAIL = **;
NAME_SUFFIX = **;
NAME_MIDDLE = **;
```

FIG. 9

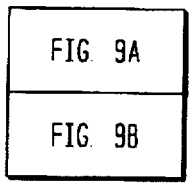

FIG. 9A

UNIVERSITY OF CLAUDE BERNARD LYON I
ENTRY AT INFORMATION SOURCE:

```
-200:1              alias: g-rech
-200:1               name: Gilles Rech
-200:1              email: Gilles.Rech@univ-lyon1.fr
-200:1              phone: +33 72 44 83 94
-200:1                fax: +33 72 44 84 10
-200:1           batiment: 101
-200:1             estage: Rez-de-chaussee
-200:1             bureau: 006
-200:1            address: Universite Claude Bernard
-200:1                   : C.I.S.M. Batiment 101
-200:1                   : 43 bvd du 11 novembre 1918
-200:1                   : 69622 Villeurbanne CEDEX
-200:1              proxy: g-rech
-200:1         department: CISM, Centre d'Informatique Scientifique et Medicale
-200:1              title: ingenieur
-200:1            project: annuaire CCSO collaborant
-200:1                www: http://www.univ.-lyon1.fr/Plaquette/cism/g-rech.html
-200:1               type: person
-200:1       organization: UCBL, Universite Claude Bernard Lyon I
-200:1                   : INSA de Lyon
```

MAPPING TO WORLD VIEW PROVIDED BY ADMINISTRATOR:
name_first: Gilles
name_middle:
name_last: Rech
name_suffix:
email: Gilles.Rech@univ-lyon1.fr
mhsmail:
www_homepage: http://www.univ-lyon1.fr/Plaquette/cism/g-rech.html
organization: UCBL\, Universite Claude Bernard Lyon I, INSA de Lyon
division:
department: CISM\, Centre d'Informatique Scientifique et Medicale
title: ingenieur
building: 101, Rez-de-chaussee, 006
street: 43 bvd du 11 novembre 1918
city: Villeurbanne
state_or_province:
postal_code: 69622
country: France
phone: +33 72 44 83 94
home_apartment:
home_street:
home_city:
home_state_or_province:
home_postal_code:
home_country:
home_phone:
last_modified:

FIG. 9B

```
MAPPING PROGRAM GENERATED BY OUR PROGRAM.
! CONSTANTS
COUNTRY = "France";

! WORLD VIEW ATTRIBUTE IS IDENTICAL TO SOURCE ATTRIBUTE.
TITLE = title ;                  ! Score: 80
DEPARTMENT = department ;        ! Score: 80
ORGANIZATION = organization ;    ! Score: 80
EMAIL = email ;                  ! Score: 80
PHONE = phone ;                  ! Score: 30
WWW_HOMEPAGE = www ;             ! Score: 30

! WORLD VIEW ATTRIBUTE IS THE CONCATENATION OF SEVERAL SOURCE ATTRIBUTES.

BUILDING = batiment + etage + bureau;   ! Score: 65

! WORLD VIEW ATTRIBUTE IS PART OF THE A SOURCE ATTRIBUTE.

NAME_FIRST = part(name,1,1,Delimiter);   ! SCORE: 50
NAME_LAST = rpart(name,1,1,Delimiter);   ! SCORE: 50

! WORLD VIEW ATTRIBUTE IS CONTAINED SOMEWHERE IN THE SOURCE ATTRIBUTE, BUT WE
! CAN NOT SAY MORE THAN THAT.

STREET = substring(address);       ! Score: 45
POSTAL_CODE = substring(address);  ! Score: 45
CITY = substring(address);         ! Score: 45

!
! Rejected mappings
!

! NAME_LAST = rpart(alias,1,1,Delimiter);   ! Score: -20
! NAME_FIRST = part(email,1,1,Delimiter);   ! Score: -20
! NAME_LAST = part(email,2,2,Delimiter);    ! Score: -20
! NAME_LAST = rpart(proxy,1,1,Delimiter);   ! Score: -20
! NAME_LAST = substring(www);               ! Score: -20
! EMAIL = name ;                            ! Score: -35

! WORLD VIEW ATTRIBUTES THAT WERE NOT FOUND IN THE SOURCE.

HOME_PHONE = **;
HOME_COUNTRY = **;
HOME_POSTAL_CODE = **;
HOME_STATE_OR_PROVINCE = **;
HOME_CITY = **;
HOME_STREET = **;
HOME_APARTMENT = **;
STATE_OR_PROVINCE = **;
DIVISION = **;
MHSMAIL = **;
NAME_SUFFIX = **;
NAME_MIDDLE = **;
```

INTEGRATION OF AN INFORMATION SERVER DATABASE SCHEMA BY GENERATING A TRANSLATION MAP FROM EXEMPLARY FILES

FIELD OF THE INVENTION

The invention relates to computer networks and databases, and specifically to sharing information from diverse information database system across a computer network.

BACKGROUND OF THE INVENTION

The amount of information connected by modern day computer and communications technology is rapidly expanding. Though much of this information is unstructured, being composed of text and images, a growing amount of the information is structured and stored in database systems. The advantage of structured information is that it allows a database system to be queried for relevant information, rather than just allowing viewing of the entire information source.

Structured information tends to vary in the way that it is stored from database system to database system. For example, in one database system, the name of a person may be stored as two separate database fields with attribute names "lastname" and "firstname". However, in another database system, the full name of a person may be stored in one database field as the attribute name, "NAME". Although both database systems carry the same information, the full name of a person, the database schema used to store the information is different. In addition, the format used to store the information may vary. For example, in one database, 50 bits may be used to save the address of a person, while in another only 40 bits may be used to store the same information. A further complication arises when the some attribute name exists in two different database systems with a different meaning in each. For example in one database system, the attribute name "person" may refer to the name John Doe, while a in a second database the attribute name "person" may refer to a social security number.

Given the large variability in the way information is stored in different database Systems on existing networks, it is impractical for a user to interact with each database system using the specific terminology of that database system. As a direct result of this, systems have been developed based on the notion of a mediator which is used to translate between information queries in one database schema to information queries in another schema. Thus, the user is able to formulate information queries to different database systems using familiar terminology.

In order for the mediator to work, when a new database system is encountered, a translation map must be developed between the schema of the new database system and an existing schema in order to integrate the new database system into the network of usable information sources. This has been considered in the database community as the schema integration problem. Many people have focused efforts to overcome the problem by attempting to design automatic or semi-automatic methods for mapping schemas of different database systems to each-other or to a global schema. The automatic methods require extensive knowledge of the meaning of the information in the databases and place an excessive burden on database administrators to express the meaning of information in a new language.

SUMMARY OF THE INVENTION the present invention eliminates the burden on database administrators of expressing the meaning of attribute names in a new language. Instead, the database administrators specify mappings between different database schemas by creating database example files containing a common body of information values stored using the corresponding attribute namers of the different database schemas.

The method of the present invention greatly reduces the burden of integrating information from a database system with a computer system. The method comprises creating a first database example file comprising attribute names having values stored in a format of a first database schema used in the database system. Then a second database example file is created comprising attribute names having values, stored in a format of a second database schema, used in the computer system. The values in the second database example file correspond to the values of the first database example file.

Once the database example files have been created, a translation map between the attributes of the first database schema and the attributes of the second database schema is generated. The translation map is based on the first database example file and the second database example file.

Once the translation map has been generated, translations are performed using the translation map, in response to information queries from the computer system. Information queries, composed using attribute names of the second database schema, are thereby translated to information queries using attribute names of the first database schema. In this way, values stored in the database system become accessible via query to the computer system.

BRIEF DESCRIPTION OF THE DRAWINGS

These and other objects, features, and advantages will be more fully appreciated with reference to the accompanying drawings.

FIG. 6 is psuedocode used to create a translation map between a world-view database schema and a local database schema based on heuristic scoring of the first and second database example files.

FIG. 7 is a list of common words used for attribute names used by the psuedocode.

FIG. 8 is comprised of FIGS. 8A and 8B, and is an example of structured information stored in the first and second database example files, and the resulting heuristic scoring and translation map generated by the pseudocode.

FIG. 9 is comprised of FIGS. 9A and 9B, and is a second example of structured information stored in the first and second database example files, and the resulting heuristic scoring and translation map generated by the pseudocode.

FIG. 10 is a flow diagram of a user formulating queries to a remote database system after a site description has been obtained and a translation map generated.

DETAILED DESCRIPTION OF THE PREFERRED EMBODIMENT

Overview

Figure 1:
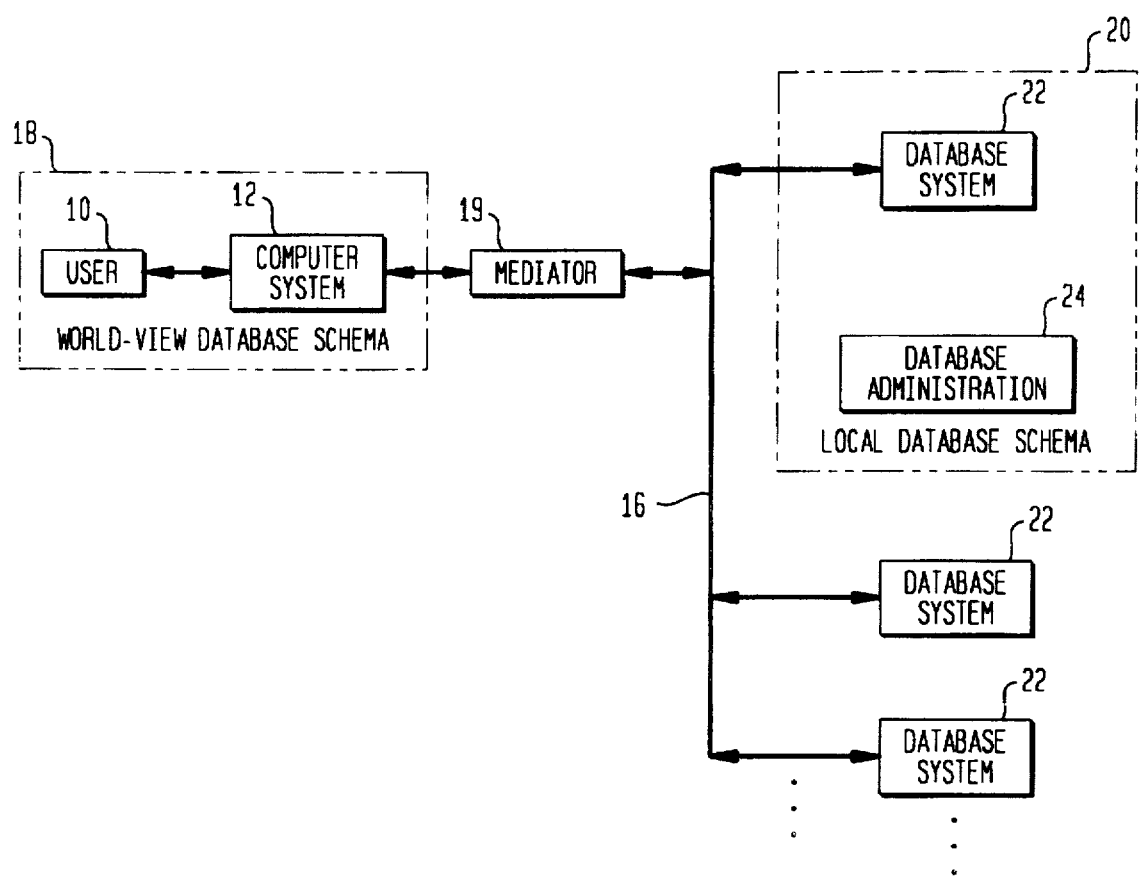
FIG. 1 is a block diagram of an integrated information system including remote database systems connected to a computer system via a computer network.

A preferred embodiment of the invention is pictured in FIG. 1. A user 10 is connected to a computer system 12 which is connected to a computer network 16 via a mediator 14. The mediator 14 may be implemented in hardware or software, and may reside on the computer system 12 itself, or on the computer a network 16. In a preferred embodiment of the invention, the mediator 14 is implemented in software residing on the computer system 12. The computer network 16 in turn is connected to a plurality of database systems 22, each database system 22 having a repository of information stored in a local database schema 20. However, in an alternate embodiment of the invention, the diverse database systems 32 may all be implemented with diverse storage devices on the same computer system 12 or with the same storage devices on the same computer system 12. Typical storage devices include tape, floppy, or hard-disk drives. CD-ROM disk drives, or solid state memory devices.

The user 10 and the computer system 12 understand structured information in a world-view database schema 18. The mediator 14 translates information queries, from a user 10 at the computer system 12, from the world-view database schema 18 to the different local database schemas 20 of the database systems 22 on the computer network 16. Thus, a user 10 can query a database system 22, recognized by the mediator 14, using the world-view database schema 19 with which the user 10 is familiar.

Adding a new database system 22 to the network of information sources recognized by the computer system 12 also utilizes the mediator 14. The user 10 must first obtain a site description from the database administrator 24. This Bite description consists of two database example files, one containing information stored in the format of the local database schema 20. The other database example file consists of the same information stored in the format of the world-view database schema 18. Based on the database example files, the mediator 14 creates a translation map.

The translation map correlates values and formats from one or more attributes in the local database schema 20 to one or more attributes in the world-view database schema 18 and vice-versa. For example the attribute in the world-view database schema 18 may be comprised of values from many attributes in the local database schema 20. Similarly, the attribute in the local database schema 20 may be comprised of one or more attributes in the world-view database schema 18. Furthermore, the translation map adds constant values, implicit to an attribute or attributes in the local database schema 20, to the corresponding attribute or attributes in the world-view database schema 18. The translation map is then utilized by the mediator 14 to translate information queries from the user 10 to the new database system 22 and to translate responses from the new database system 22 back to the user 10. Both of the above translations can also occur in reverse order, when the information queries are issued from the local database system 22 to the computer system 12.

Obtaining a site description

Figure 2:
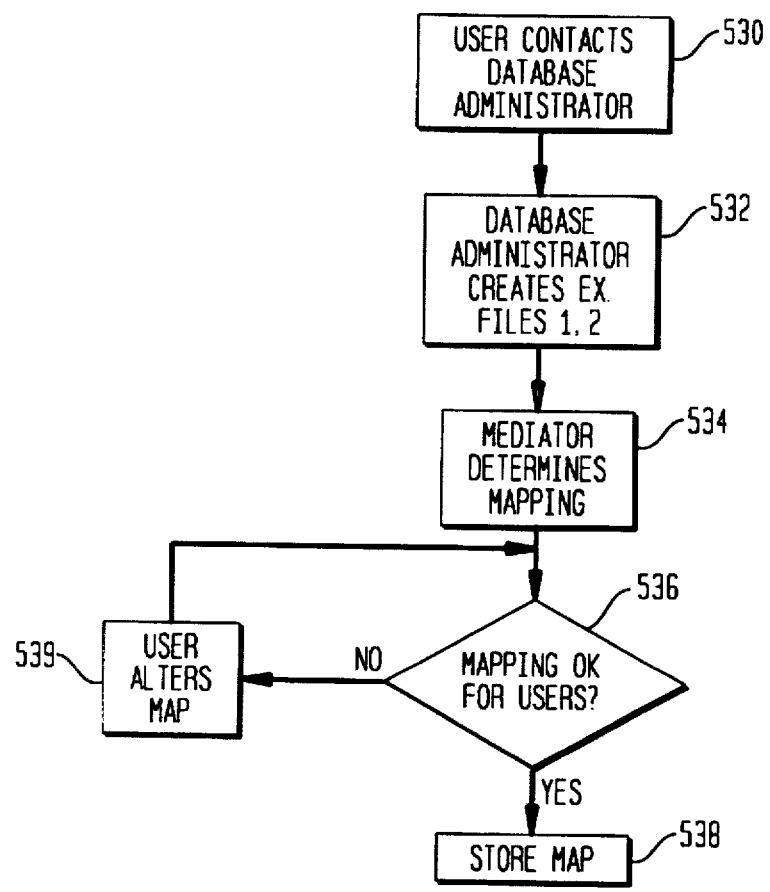
FIG. 2 is a flow diagram of a user obtaining a site description for a new remote database system, where the database administrator creates both first and second database example files.

The user 10 may obtain a site description of a new remote database system 22 in a number of different ways. In a first embodiment of the invention, shown in FIG. 2, the user 10 obtains a site description by contacting the database administrator 24 at the remote database system 22 that the user 10 desires to add to the computer network 16 in step S30. The user 10 requests the database administrator 24 to create two database example files, which the database administrator does in step S32. The first database example file contains attribute names having values stored in the format of the local database schema 20 used in the new database system 22. The second database example file comprises attribute names having values stored in the format of a world-view database schema 18, provided by and understood by the user 10. The values in the second database example file correspond to the values in the first database example file and the two together constitute the site description. Based on the site description, the mediator 14 then generates a translation map between the world-view database schema 18 and the local database schema 20 of the new database system 22 in step S34. The user 10 must then decide if the map is sufficient in step S36. If so, the translation map is stored by the mediator 14 in step S38 and will subsequently be used to translate queries from the user 10 to the database system 22. If not, the user 10 may alter the translation map in step S39.

Figure 3:
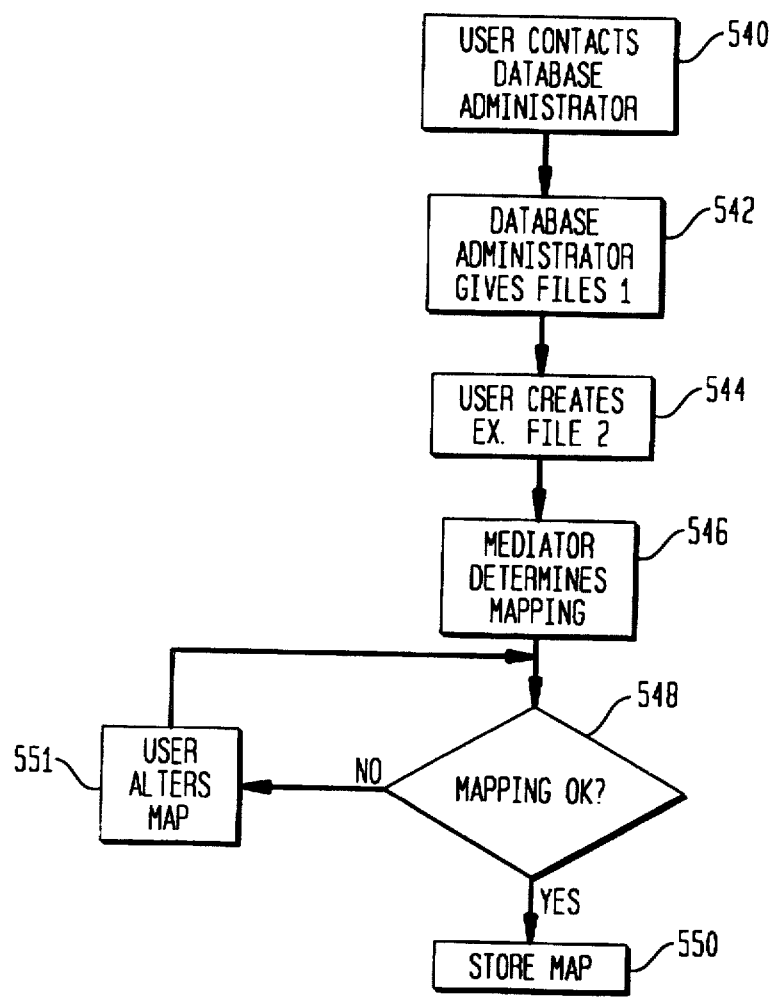
FIG. 3 is a flow diagram of a user obtaining a site description for a new remote database system, where the database administrator creates a first database example file. The user then creates the second database example file.

In a second embodiment of the invention, shown in FIG. 3, the user 10 first contacts the database administrator 24 in step S40. The database administrator 24 then sends the user 10 a first database example file comprising attribute names having values stored in the format of the local database schema 20 used in the remote database system 22 in step S42. Than in step S44, the user 10 creates the second database example file by mapping values from attribute names in the local database schema 20 to corresponding attribute names in the world-view database schema 18 understood by the user 10. The mediator 14 then generates a translation map from database example files 1 and 2 in step S46. The user 10 must then determine if the translation map is suitable in step S48. If so, the translation map is stored in step S50 for subsequent use in translating information queries from the user 10. If not suitable, the translation map is altered by the user 10 to suit the user's purposes in step S51.

Figure 4:
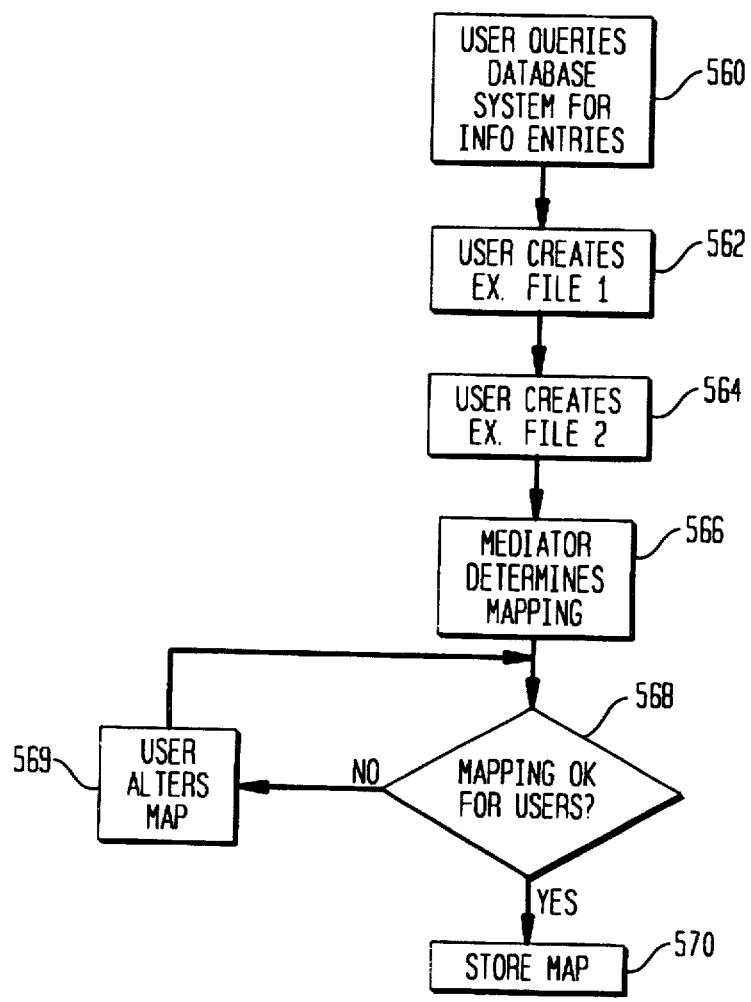
FIG. 4 is a flow diagram of a user who constructs both the first and second database example files for a new remote database system without contacting the database administrator.

In a third embodiment of the invention, shown in FIG. 4, the user 10 does not contact the remote database administrator 24 at all. Instead, the user 10 performs experimental information queries in step S60 on the remote database system 22, operating in the local database schema 20. Then, based on the experimental query results, the user 10 constructs a first database example file comprising attribute names and stored values dictated by the local database schema 20 in step S62. Then, in step S64, the user 10 further constructs the second database example file by mapping the values in the local database schema 20 to corresponding attribute names in the world-view database schema 18 of the user 10. The mediator 14 then generates a translation map based on the first and second database example files in step S66. Then, the user 10 must determine if the translation map is suitable in the decision step S68. It the translation map is suitable, the mediator 14 stores the translation map in step S70 for subsequent use in translating information queries from the user 10. If not, the user 10 may change the translation map to achieve a desired result in step S69.

Figure 5:
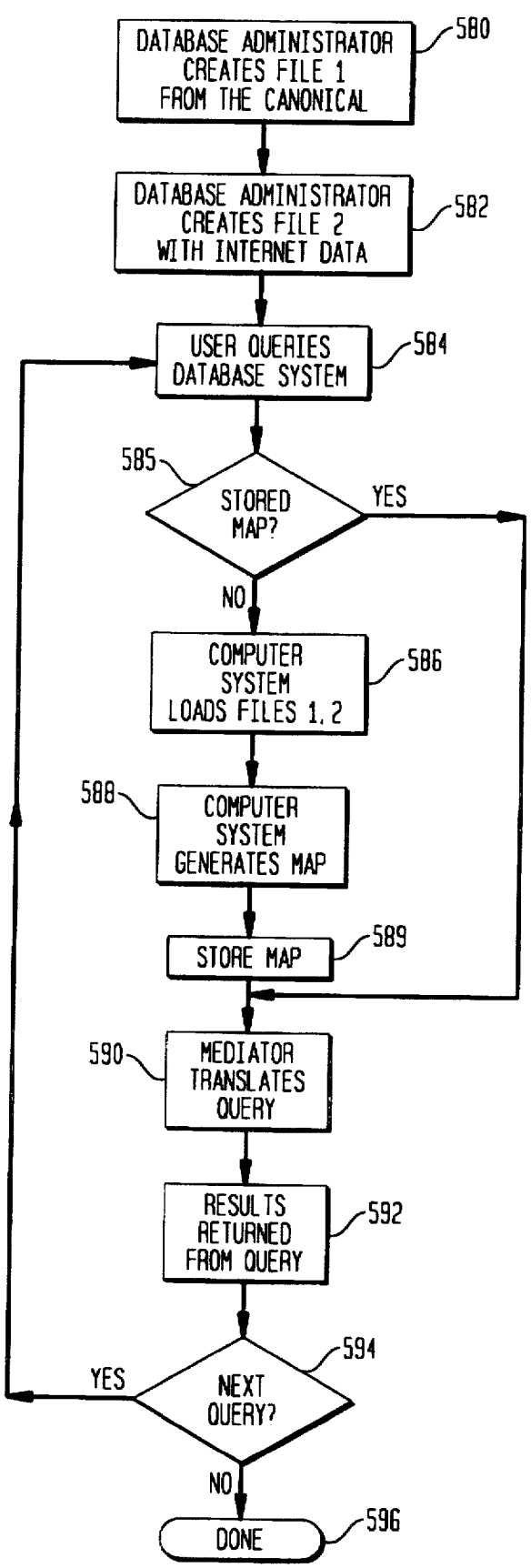
FIG. 5 is a flow diagram of a user who queries a new remote database system in which the database administrator has already created first and second database example files based on a widely known world-view database schema.

In a fourth embodiment of the invention, shown in FIG. 5, the world-view database schema 18 is widely known. Specifically, a world-view database example file exists, contains attribute names and values stored in canonical form, and is widely known and available. The canonical form is designed to assign unambiguous values to attributes in the world-view database schema 18 in the format of the world-view database schema 18.

The database administrator 24 then, as a matter of course, creates the first and second database example files based on the world-view database example file, in steps S80 and S82. The first database example file contains values from the canonical form of the world-view database example file stored in the corresponding attribute name or names of local database schema 20.

The second database example file is a copy of the world-view database example file, unless the local database schema 20 contains implicit information. In this case, the implicit information replaces the canonical values of one or more attribute names in the world-view database example file to create the second database example file.

The database administrator 24 then stores the first and second database example files on the database system 22 in files having generic names widely understood by those using the world-view database schema 18. Then in step S84, the database System 22 is queried by a new user 10 from a computer system 12. If there is no stored translation map in decision box S85, then the first and second database example files will then automatically be loaded into the computer system 12 in step S86; otherwise, proceed with step S90. The mediator 14 then reads the first and second database example files and generates a translation map in step S88. Subsequently, the mediator 14 can store the translation map in step S89. Then, the user's query is translated in step S90, based on the translation map. Subsequently, results from the information query are returned to the user 10 in step S92. Then in decision step S94, the user 10 may make another information query or be done in step S96. In this manner, the user 10 will be able to query a previously unknown database system 22 and be able to perform information queries in the world-view database schema 16. The information queries will then be automatically translated to the remote database system 22 without having to contact the database administrator 24 or construct database example files.

In a fifth embodiment of the invention, the user 10 may not operate in the world-view database schema 18, but rather may operate in a local database schema 20 different from that of the remote database system 22 sought to be integrated. The user 10 may have resident on his computer system 12 a third and fourth database example files corresponding to the user's local database schema 20 and the world-view database schema 18 respectively. These third and fourth database example files then would form the basis for a translation map from the user's local database schema to the world-view database schema 18. In this scenario, the user 10 would be able to automatically contact a previously unknown database system 22 and present a query in the user's own local database schema. The mediator 14 would then automatically translate the user's information query from the user's local database schema 20 to the world-view database schema 18 based on the third and fourth database example files. In turn, the mediator 14 would translate the user's query from the world-view database schema 18 to the local database schema 20 of the remote database system 22. All of this would occur automatically without a need to contact the remote database administrator 24.

Generating Mappings

There are three kinds of information given in a description of an information source which are accounted for using formal logical sentences; relation and attribute mappings; format mappings; and integrity constraints on the source.

In the following logical sentences the R's represent attribute relations in the world-view database schema, the E's represent attribute name relations in the same local database schema. The f can play two roles. First, it can translate between the formats used in the world-view database schema 18 and the information source. Second, it can compose a world-view database schema 18 attribute from several attributes in the information source or vice-versa.

1. $R(x,y)=E_1(x,x_1) + e.cir + ee \ldots E_n(x,x_n)=f(X_1, \ldots, x_n)$

In this logical sentence, the attribute in the world-view database schema 18 is composed of several attributes in the local database schema 20.

2. $R_1(x,x_1) + e.cir + ee \ldots R_n(x,x_n) + e.cir + ee \ y=f(x_1, \ldots, x_n)=E(x,y)$ In this logical sentence, an attribute name in the remote database schema 20 is composed of multiple attribute names in the world-view database schema 18.

3. $R(x,y)=C$

In this logical sentence, the attribute in the world-view database schema is a constant. This logical sentence expresses an integrity constraint on the values in an information source.

In a preferred embodiment of the invention, the logical sentences above are generated for each attribute name in the world-view database schema using a heuristic scoring approach to mapping. FIG. 6 depicts pseudocode used to implement, in computer software or hardware, a system for generating a translation map from database example files corresponding to a local database schema 20 and a world-view database schema 18.

In program step PS1, database example files 1 and 2 are loaded in the memory of the computer system 12. Program step PS2 is comprised of sub-steps PS2A–PS2E designed to determine all possible attribute mappings. In program step PS2A, for each attribute in database example file 2, the program looks for an attribute in database example file 1 that matches the entire value of an attribute in database example file 2. In program step PS2B, for each attribute in database example file 2, the program looks for a plurality of attributes in database example file 1 containing the values of the attribute in database example file 2. In program step PS2C, for each attribute in database example file 1, the program looks for a plurality of attributes in database example file 2 containing the values of the attribute in database example Rile 1. In program step PS2D, the program flags any of the mappings determined in program steps PS2A–PS2C that have missing values. In program step PS2E, the program looks for attributes from database example file 2 that have no mappings in database example file 1. When this occurs, the attribute value in database example file 2 is a constant.

Program step PS3 is comprised of Sub steps PB3A–PS3B. Here, the program executes a scoring algorithm as detailed below in order to determine the best mapping from among the possible mappings. In program step PS3A, if there is a 1—1 attribute mapping between an attribute in database example file 1 and database example file 2, +10 points are assigned to the mapping. In program step PS3B, if there is a 1—1 mapping and the 1—1 mapping is case sensitive, +20 points are added. In program step PS3C, if the 1—1 mapping agreed with common words for the attribute names as shown in FIG. 7, the mapping is given +50 points. A file of such common attribute names is maintained by the user 10 and is capable of being changed. In step PS3D, if the mapping is Many-1 or 1-Many, 5 points are added to the mapping for every field that matches. An additional 10 points are added it the mapping is case sensitive. In step PS35, if there are no missing values in a Many-1 or 1-Many mapping, 20 points are added to the mapping.

Program step PS4 is directed to scoring comparatively the mappings scored in program step PS3, in order to pick the best set of mappings from among the choices. In Program step PS4A, if a Many-1 mapping or 1-Many mapping contains an attribute with a 1—1 mapping that has a score of 20 or better, the I-Many or Many-1 mapping score is downgraded by 25 points. In program step PS4B, if a Many-1 or 1-Many rapping includes an attribute with another Many-1 or 1-Many mapping having a score of 20 or better, 25 points are removed from the Many-1 or i-Many mapping in question. In program step PS4C, if a 1—1 mapping includes an attribute with another 1—1 mapping having more than 40 points, 25 points are subtracted from the 1—1 mapping in question.

In program step PS5, logical translation sentences are generated from the mappings having the best scores.

FIGS. 8, comprised of FIGS. 8A and 8B, depicts an example of information stored in a database system. There is a first database example file containing information stored in the local database schema 20. Also, a second database example file is shown containing values stored in the format of the world-view database schema 18. Further, FIG. 8 shows the heuristic scoring and attribute mapping as determined by the mediator 14 implementing the pseudocode of FIG. 6. FIG. 9, comprised of FIG. 9A and 9B, is a second example analogous to FIG. 8.

User Queries

After the translation map has been generated, a user 10 can generate information queries to the remote database system 22 using the attribute names of the user's world view database schema 18, as shown in FIG. 10. The user 10 issues an information query to the user's computer system 12 in step S100. The mediator 14 accepts the query posed by the user 10 and translates the user's information query in Step S102 from the world-view database schema is to the local database schema 20 of the remote database system 22 from which the user 10 needs information. The user 10 may either target the remote database system 22 directly, or the mediator 14 may direct and translate a given user 10 query to the appropriate remote database system 22 or database systems which Can most efficiently supply the requested information. Subsequently, as shown in FIG. 8, results from the user's query are returned to the user 10 in step S104. The user 10 must then decide in step S106 whether to continue to query for lore information or stop in step S108.

Although specific embodiments of the invention have been disclosed, it will be understood by those having skill in the art that changes can be made to those specific embodiments without departing from the spirit and the Scope of the invention.

What is claimed is:

1. A method of integrating information from a database system with a computer system, comprising the steps of:

a) creating a first database example file comprising first attribute names having first values stored in a first format of a first database schema used in a database system;

b) creating a second database example file comprising second attribute names having second values, stored in a second format of a second database schema, used in a computer system, said second values in said second database example file corresponding to said first values of said first database example file;

c) generating a translation map between said first attribute names of said first database schema and said second attribute names of said second database schema, based on scoring possible mappings between said corresponding first and second values and formats; and d) performing translations using said translation map of information queries issued from said computer system and composed using attribute names of said second database schema, to information queries using attribute names of said first database schema, making said second values stored in said database system accessible to said computer system.

2. The method of claim 1, wherein said first database example file and said second database example file are created with a keyboard.

3. The method of claim 1, wherein said first database example file and said second database example file are stored on said database systems so that step c) can occur in response to a query to said database system for said first database example file and said second database example file.

4. The method of claim 1, wherein said first database example file and said second database example file are stored on said computer system.

5. The method of claim 1, wherein said second database example file is created by a user at said computer systems based on said first database example file.

6. The method of claim 1, wherein a user creates said first database example file based on queries of said database system, and creates said second database example file based on said first database example file.

7. The method of claim 1, wherein said first database schema is a local schema and said second database schema is a world-view schema.

8. A method according to claim 1, wherein said scoring of possible mappings between said corresponding first and second values and formats includes assigning points for one to one mapping, many to one mapping, and one to many mapping.

9. The method according to claim 9, further comprising the step of altering the assigned points based on comparative mapping scoring.

10. A method according to claim 9, further comprising the step of selecting one of said possible mappings with the highest score as said translation map.

11. A method of integrating information from a data base system, having a first local database schema, with a computer system having a second local database schema, via intermediate translations to a world-view database schema, comprising the steps of:

a) creating a first database example file comprising first attribute names having first values stored in a first format of a first local database schema used in a database system;

b) creating a second database example file comprising second attribute names having second values, stored in a second format of a world-view database schema, said second values in said second database example file corresponding to said first values of said first database example file;

c) creating a third database example file comprising third attribute names having third values stored in a third format of a second local database schema used in a computer system;

d) creating a fourth database example file comprising fourth attribute names having values, stored in a fourth format of said world-view database schema, said values in said fourth database example file corresponding to said values of said third database example file;

e) generating a translation map between said first attribute names of said first local database schema and said second attribute names of said world-view database schema, based on scoring possible mappings between said corresponding first and second values and formats;

f) generating a translation map between said third attribute names of said second local database schema and said fourth attribute names of said world-view database schema, based on scoring possible mappings between said corresponding third and fourth values and formats; and g) performing translations using said translation map of information queries issued from said computer system and composed using said third attribute names of said second local database schema, to information queries using first attribute names of said first local database schema, via intermediate translations to said world view database schema, making said first values stored in said database system accessible to said computer system.

12. A system comprising:

a computer system for formulating information queries using a first database schema characterized by a first database example file comprising attribute names having values stored in a format of said first database schema;

a database system, including a database for storing information in data records, using a second database schema characterized by a second database example file comprising attribute names having values stored in a format of said second database schema, said values in said second database example file corresponding to said values in said first database example file; and a mediator, coupled between said computer system and said database system, for creating a translation map between said first database schema and said second database schema, based on said first database example file and said second database example file, said mediator further performing translations in response to information queries from said computer system;

a second database example file, comprising attribute names having values stored in said format of said second database schema, said values in said second database example file corresponding to said values in said first database example file; and a mediator for creating a translation map, between said first database schema and said second database schema, based on said first database example file and said second database example file, said mediator further performing translations in response to information queries from said computer system;

whereby information queries composed using attribute names of said second database schema are translated to information queries using attribute names of said first database schema, thus making values stored in said database system accessible to said computer system.

* * * * *